US012721471B1

(12) United States Patent
Cheng

(10) Patent No.: US 12,721,471 B1
(45) Date of Patent: Sep. 1, 2026

(54) THERMAL INSULATION MAT

(71) Applicant: Yangyang Cheng, Guangzhou (CN)

(72) Inventor: Yangyang Cheng, Guangzhou (CN)

( * ) Notice: Subject to any disclaimer, the term of this patent is extended or adjusted under 35 U.S.C. 154(b) by 0 days.

(21) Appl. No.: 19/328,339

(22) Filed: Sep. 15, 2025

(30) Foreign Application Priority Data

Aug. 22, 2025 (CN) ......................... 202521799402.2

(51) Int. Cl.

| | |
|---|---|
| ***A47J 36/34*** | (2006.01) |
| ***B32B 7/09*** | (2019.01) |
| ***B32B 7/12*** | (2006.01) |
| ***B32B 15/14*** | (2006.01) |
| ***B32B 15/20*** | (2006.01) |
| ***B32B 25/08*** | (2006.01) |
| ***B32B 37/00*** | (2006.01) |
| ***B32B 37/12*** | (2006.01) |

(52) U.S. Cl.
CPC ................. *A47J 36/34* (2013.01); *B32B 7/09* (2019.01); *B32B 7/12* (2013.01); *B32B 15/14* (2013.01); *B32B 15/20* (2013.01); *B32B 25/08* (2013.01); *B32B 37/1207* (2013.01); *B32B 37/156* (2013.01); *B32B 2307/304* (2013.01); *B32B 2307/7376* (2023.05)

(58) Field of Classification Search
CPC ... A47J 36/34; B32B 7/09; B32B 7/12; B32B 15/14; B32B 15/20; B32B 25/08; B32B 37/1207; B32B 37/156; B32B 2307/7376; B32B 2307/304
See application file for complete search history.

(56) References Cited

U.S. PATENT DOCUMENTS 6,289,968 B1 * 9/2001 Karten .................. B60J 1/2091
160/370.21

FOREIGN PATENT DOCUMENTS

CN 110250832 A * 9/2019 ........... A47G 9/0207

* cited by examiner

*Primary Examiner* — Maria V Ewald
*Assistant Examiner* — Ethan Weydemeyer
(74) *Attorney, Agent, or Firm* — JEEN IP LAW, LLC

(57) ABSTRACT

This application provides a thermal insulation mat, which includes a main body portion, folded portions, and edge portions, wherein the edge portions are arranged at edges of the main body portion, and the folded portions penetrate through the main body portion; the main body portion includes a first thermal insulation layer and a second thermal insulation layer, and the first thermal insulation layer includes an upper thermal insulation sheet and a lower thermal insulation sheet; the upper thermal insulation sheet and the lower thermal insulation sheet are arranged opposite to each other to form a receiving space; the second thermal insulation layer is sandwiched between the upper thermal insulation sheet and the lower thermal insulation sheet. The mat is good in thermal insulation effect and easily stored.

12 Claims, 16 Drawing Sheets

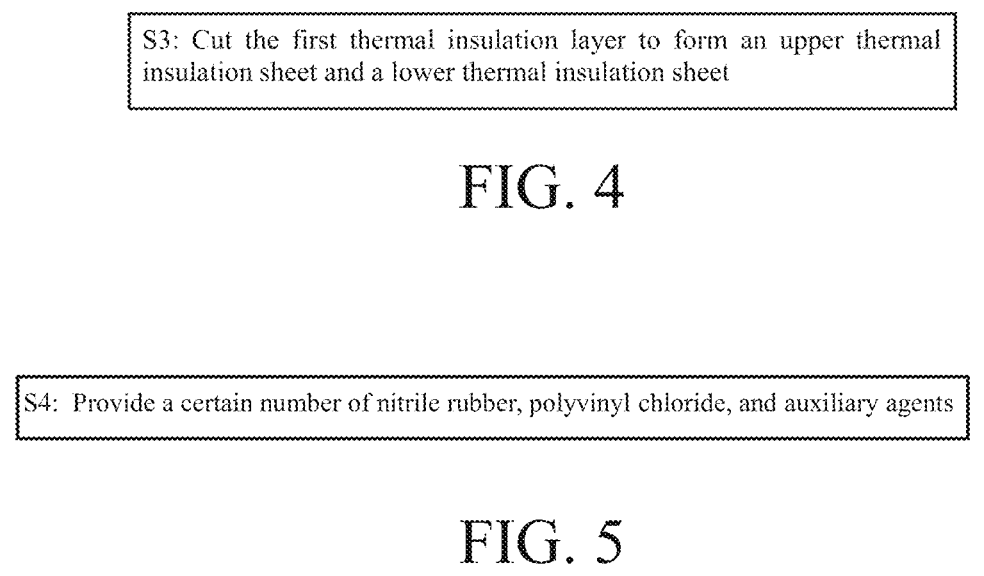

S3: Cut the first thermal insulation layer to form an upper thermal insulation sheet and a lower thermal insulation sheet

FIG. 4

S4: Provide a certain number of nitrile rubber, polyvinyl chloride, and auxiliary agents

FIG. 5

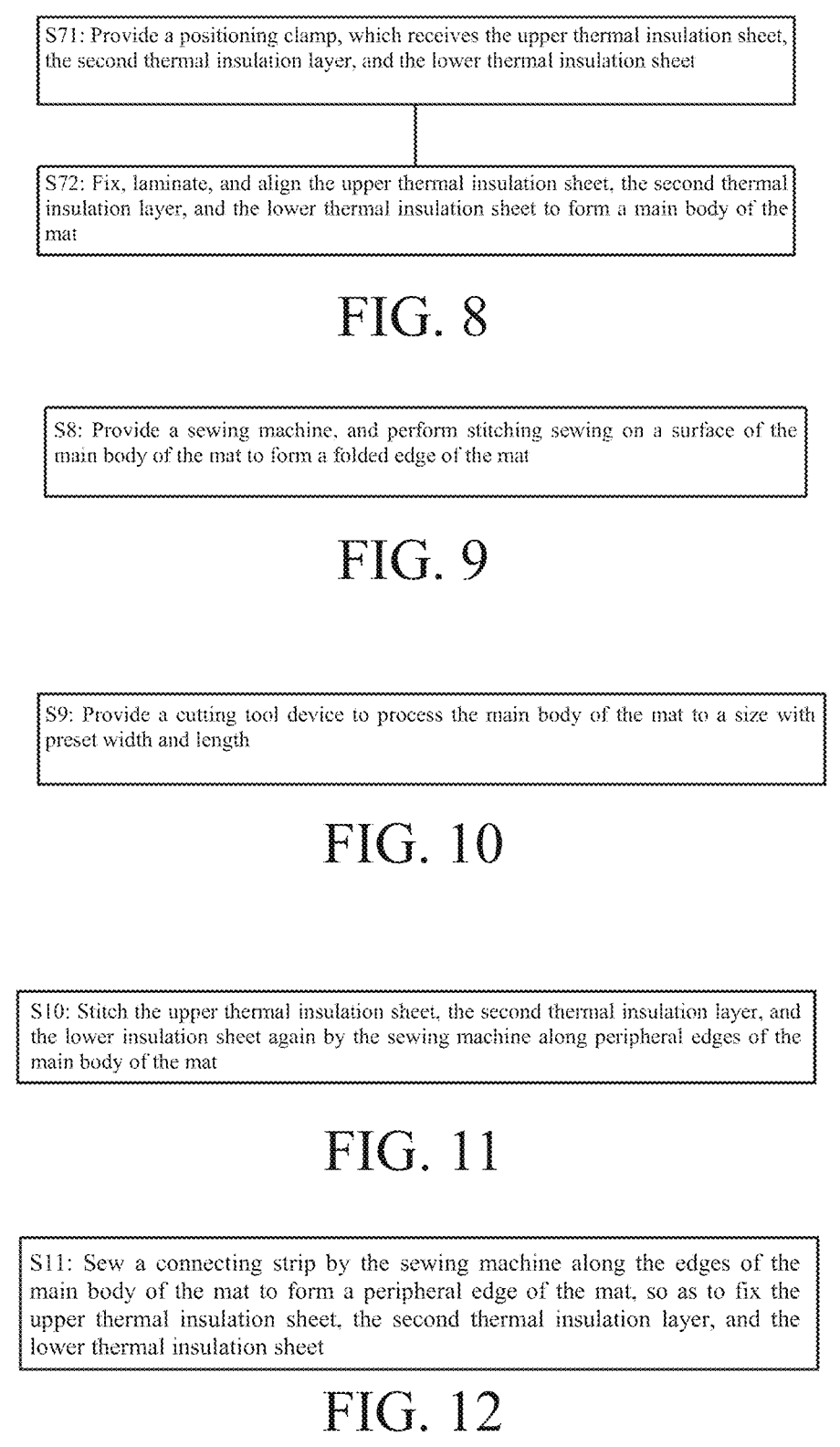

S71: Provide a positioning clamp, which receives the upper thermal insulation sheet, the second thermal insulation layer, and the lower thermal insulation sheet S72: Fix, laminate, and align the upper thermal insulation sheet, the second thermal insulation layer, and the lower thermal insulation sheet to form a main body of the mat

FIG. 8

S8: Provide a sewing machine, and perform stitching sewing on a surface of the main body of the mat to form a folded edge of the mat

FIG. 9

S9: Provide a cutting tool device to process the main body of the mat to a size with preset width and length

FIG. 10

S10: Stitch the upper thermal insulation sheet, the second thermal insulation layer, and the lower insulation sheet again by the sewing machine along peripheral edges of the main body of the mat

FIG. 11

S11: Sew a connecting strip by the sewing machine along the edges of the main body of the mat to form a peripheral edge of the mat, so as to fix the upper thermal insulation sheet, the second thermal insulation layer, and the lower thermal insulation sheet

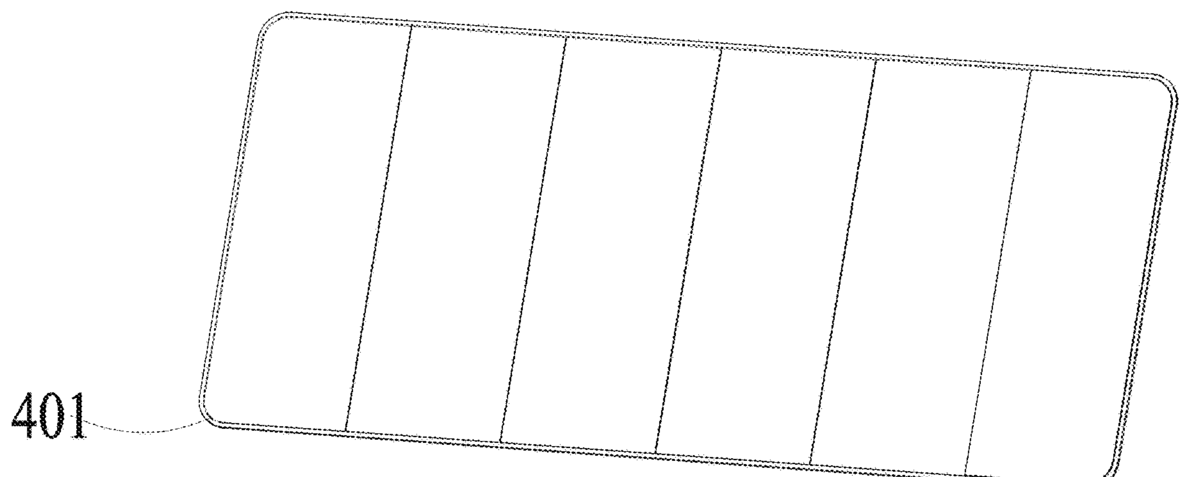
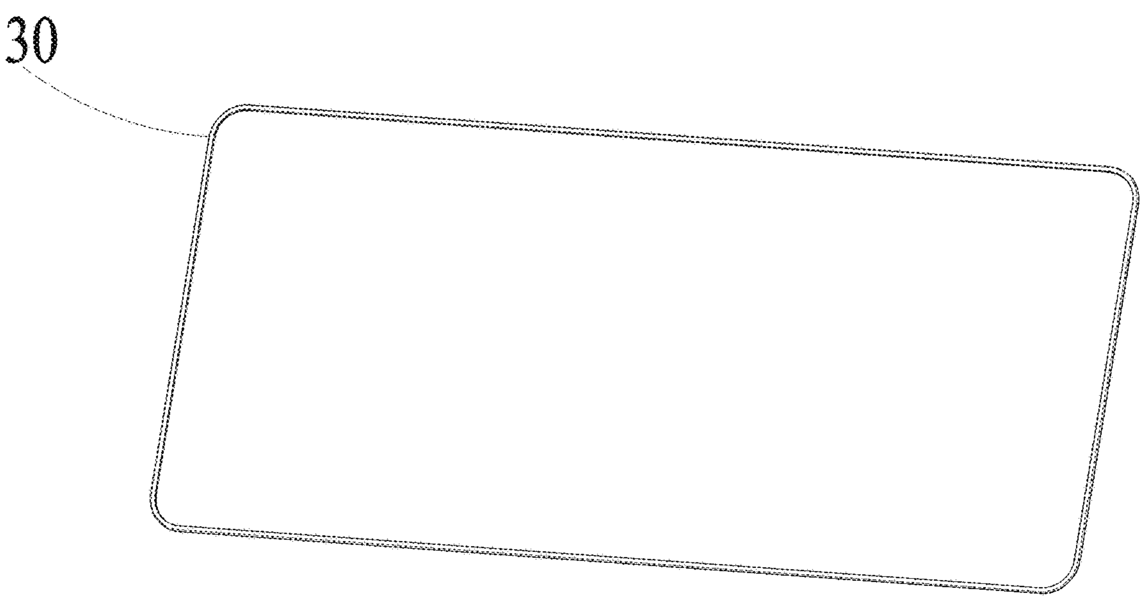
FIG. 18

THERMAL INSULATION MAT

CROSS-REFERENCE TO RELATED APPLICATIONS

This application claims priority to Chinese Patent Application No. 202521799402.2, filed on Aug. 22, 2025, which is hereby incorporated by reference in its entirety.

TECHNICAL FIELD

This application relates to the technical field of mats, and in particular, to a thermal insulation mat.

BACKGROUND

In daily life, during dining, people heat dishes and rice through a tabletop intelligent heating system, making the temperature of the tabletop and tableware usually high, resulting in damage of the tabletop. For example, in a scenario where a flexible heating plate is in direct contact with the tabletop, the flexible heating plate will make the temperature of the tabletop rise, which, for example, damages marbles, quartz stones, glass, and solid wood tabletops, and the like. For example, in terms of a baking tray or an air drier just taken out of an oven or a casserole pot, or a stir-fry pan just boiling, if the above heat-generating objects are directly placed on a tabletop with a non-heat-resistant surface, the tabletop will also be damaged. Based on the above various application scenarios, a thermal insulation mat is conceived to insulate food materials, tableware, or other daily articles.

However, based on market research and practical use, existing thermal insulation mats are poor in structural stability, insufficient in thermal insulation performance, inconvenient to store, and poor in environmental protection during actual use. For example, conventional thermal insulation mats are usually formed by bonding a plurality of layers of materials with glue, and layering and falling problems due to aging of glue in high-temperature environments easily occur, which affects the service life. For another example, heat reflection and thermal conduction barrier can hardly be considered due to a single material of a conventional thermal insulation mat, such as rubber or a fabric, resulting in a poor control effect on the tabletop temperature. For another example, the conventional thermal insulation mat lacks a special folding design, is large in volume after being unfolded, is easy to deform after being folded, and occupies a storage space. For another example, the material of most conventional thermal insulation mats cannot be degraded or recovered, and environmental pollution is caused after the material is discarded. The above various problems result in poor usage experience of clients, and there is the technical problem of poor safety performance.

SUMMARY

Based on the above technical problem, the application provides a thermal insulation mat, including a main body portion, at least one folded portion, and edge portions, where the edge portions are arranged at edges of the main body portion, and the folded portion penetrates through the main body portion;

the main body portion includes: a first thermal insulation layer, and a second thermal insulation layer, where the first thermal insulation layer includes an upper thermal insulation sheet and a lower thermal insulation sheet, the upper thermal insulation sheet consists of a fabric, a coating, and an aluminum foil, and the coating is applied between the aluminum foil and the fabric; the upper thermal insulation sheet is configured a surface of the mat and is configured to contact a heat source; the upper thermal insulation sheet and the lower thermal insulation sheet are arranged opposite to each other to form a receiving space, the lower thermal insulation sheet consists of a fabric, a coating, and an aluminum foil, and the coating is applied between the aluminum foil and the fabric; the lower thermal insulation sheet is configured a bottom surface of the mat, and the upper thermal insulation sheet and the lower thermal insulation sheet are arranged opposite to each other to form a receiving space; the second thermal insulation layer is substantially the same to the first thermal insulation layer in shape and size, made of a flexible material, and sandwiched between the upper thermal insulation sheet and the lower thermal insulation sheet; the upper thermal insulation sheet, the second thermal insulation layer, and the lower thermal insulation sheet are stacked from top to bottom in sequence to form the main body portion; the edge portion includes: a connecting strip, the connecting strip is arranged along the edge portion, and the connecting strip fixes the upper thermal insulation sheet, the second thermal insulation layer, and the lower thermal insulation sheet from top to bottom in sequence by way of a stitching thread, such that the upper thermal insulation sheet, the second thermal insulation layer, and the lower thermal insulation sheet are aligned from top to bottom in sequence; and the upper thermal insulation sheet, the second thermal insulation layer, and the lower thermal insulation sheet are foldable along the folded portion.

Specifically, the upper thermal insulation sheet includes an outer surface and an inner surface, the outer surface and the inner surface are arranged opposite to each other, the aluminum foil, the coating, and the fabric are superposed from outside to inside in sequence between the outer surface and the inner surface, and the aluminum foil, the coating, and the fabric are formed by a hot pressing process; and the aluminum foil forms the outer surface, the fabric forms the inner surface, and the coating is sandwiched between the outer surface and the inner surface.

Specifically, the lower thermal insulation sheet includes an outer surface and an inner surface, the outer surface and the inner surface are arranged opposite to each other, the aluminum foil, the coating, and the fabric are superposed from outside to inside in sequence between the outer surface and the inner surface, and the aluminum foil, the coating, and the fabric are formed by a hot pressing process; and the aluminum foil forms the outer surface, the fabric forms the inner surface, and the coating is sandwiched between the outer surface and the inner surface.

Specifically, a texture is arranged on the surface or the bottom surface of the mat and comprises a concave area and a convex area, the concave area and the convex area are arranged adjacent to each other, and a shape of the convex area is at least one of a circle, a triangle, a polygon, an ellipse, and an irregular shape.

Specifically, the upper thermal insulation sheet and the lower thermal insulation sheet are substantially the same in shape and size.

Specifically, the fabric is at least one of an oxford fabric, or a canvas, or a plain weave fabric.

Specifically, a material of the coating is at least one of PE, PU, TPU, PVC, and PET.

Specifically, the second thermal insulation layer includes: a second aluminum foil;

- a rubber-plastic material; and a third aluminum foil, where the second aluminum foil, the rubber-plastic material, and the third aluminum foil are arranged in sequence and are all of sheet structures, where the rubber-plastic material is sandwiched between the second aluminum foil and the third aluminum foil, and the second aluminum foil, the rubber-plastic material, and the third aluminum foil are substantially the same in shape and size.

Specifically, a thickness of the upper thermal insulation sheet and the lower thermal insulation sheet is 0.3-0.9 mm, and a thickness of the second thermal insulation layer is 3-12 mm.

Specifically, the folded portion includes at least one stitching thread, the stitching thread extends along the main body portion from one edge portion to another edge portion and penetrates through the main body portion; and a thickness of the folded portion is less than a thickness of the main body portion.

Specifically, a thickness of the folded portion is less than a thickness of the main body portion. And a thickness range of the main body portion is 3-15 mm.

Specifically, the thermal insulation mat is capable of being at least folded twice along the stitching thread.

Specifically, a shape of the stitching thread on the main body portion is at least one of a parallel line, a cross shape, or a quadrilateral grid pattern.

Specifically, after being folded along the folded portion, the main body portion is divided into a plurality of rectangles along the folded portion.

Specifically, the main body portion has a folded state and an unfolded state; when folded along the folded portion, the main body portion is in the folded state; and when located in the same plane, the main body portion is in the unfolded state.

Compared with the prior art, the fabric, in this technical solution, the coating, and the aluminum foil are combined by a hot-pressing lamination process to respectively form the upper thermal insulation sheet and the lower thermal insulation sheet and are sewed and fixed in combination with a woven tape to prevent a layering risk at a high temperature, thereby enhancing the structural durability. Thermal radiation is reflected by the top aluminum foil and the bottom aluminum foil. The middle rubber-plastic material of the second thermal insulation layer includes a microporous structure to block heat conduction to achieve double thermal insulation, thereby effectively reducing the temperature of the table board or the temperature of the tableware. The mat may be folded many times along a predetermined trajectory due to the folded portion of the surface stitching thread of the mat. Compared with the volume in the unfolded state, the volume in the folded state is reduced, such that the mat is adapted to a drawer or a portable scenario.

BRIEF DESCRIPTION OF DRAWINGS

The drawings described herein are provided for further understanding of this application and constitute a part of this application. The schematic embodiments and descriptions of this application are used to explain this application and do not constitute undue limitations on this application. Some specific embodiments of this application will be described in detail below with reference to the drawings in an exemplary, rather than non-restrictive manner. The same reference signs in the drawings mark the same or similar components or parts. Those skilled in the art should understand that these drawings are not necessarily drawn in proportion. In the figure.

FIG. 4 is a flow diagram of a step S3.

FIG. 5 is a flow diagram of a step S4.

FIG. 8 is a flow diagram of a step S7.

FIG. 9 is a flow diagram of a step S8.

FIG. 10 is a flow diagram of a step S9.

FIG. 11 is a flow diagram of a step S10.

FIG. 12 is a flow diagram of a step S11.

FIG. 15 is a side structural schematic view of a thermal insulation mat provided by this application.

FIG. 18 is an exploded structural diagram of a thermal insulation mat provided by this application from another perspective.

FIG. 22 is a schematic diagram of a second thermal insulation layer of a thermal insulation mat provided by yet another embodiment of this application in an unfolded state.

DESCRIPTION OF EMBODIMENTS

Figure 1:
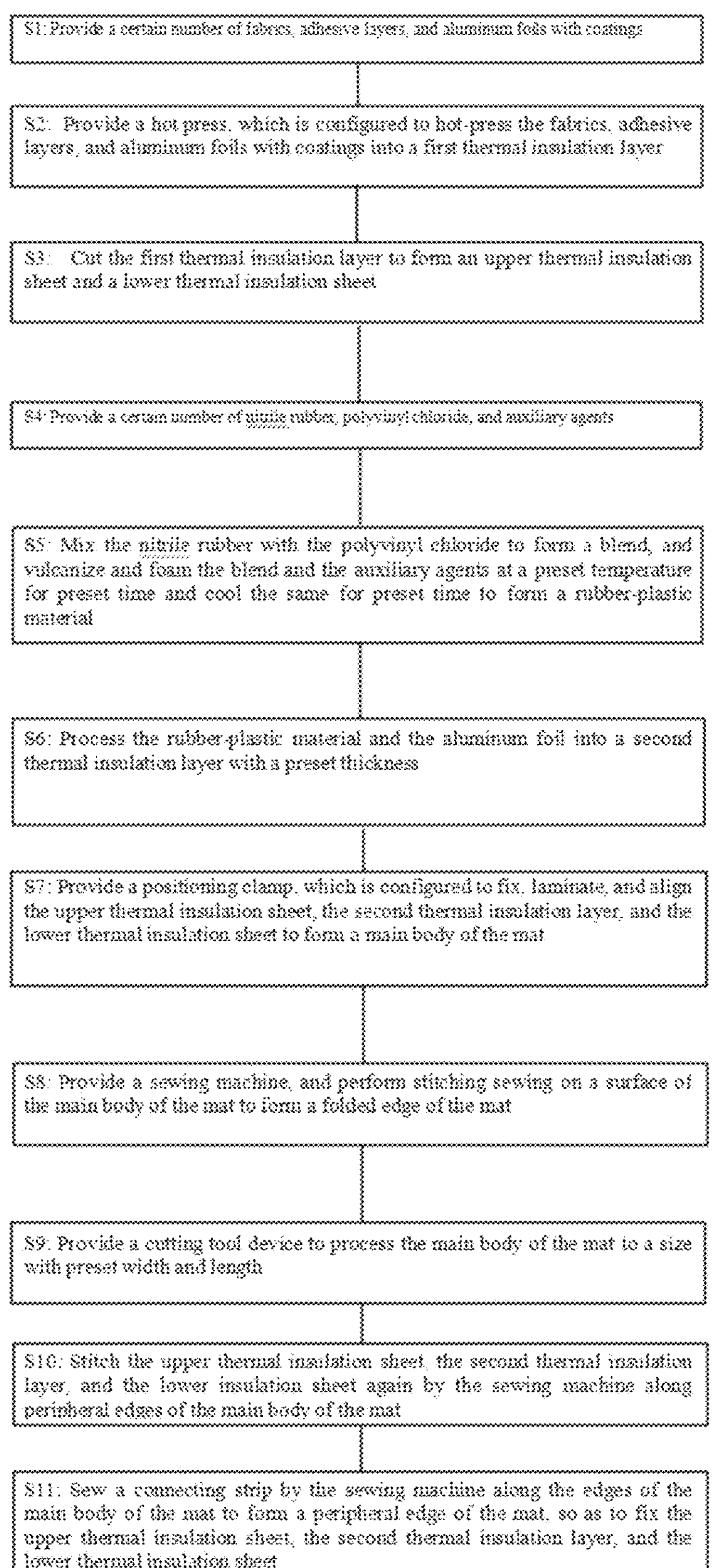
FIG. 1 is a flow diagram of a method for forming a thermal insulation mat provided by this application.

The technical solutions in the embodiments of this application will be described clearly and completely below in conjunction with the drawings in this application. Apparently, the described embodiments are merely a part of the embodiments, rather than all the embodiments, of this application. All other embodiments obtained by those of ordinary skill in the art based on the embodiments of this application without making creative efforts shall fall within the protection scope of this application.

It should be noted that all directional indications (for example, upper, lower, left, right, front, back, and the like) in the embodiments of this application are merely used for explaining relative position relations, moving conditions, and the like among components in a certain special gesture (as shown in the drawings). If the special gesture changes, the directional indications change correspondingly.

In addition, the descriptions of "first", "second", and the like in this application are used for the purpose of description only, but cannot be understood as indicating or implying the relative importance thereof or implicitly indicating the number of the indicated technical features. Thus, features defining "first" and "second" may explicitly or implicitly include at least one feature. In the description of this application, unless otherwise specified, "a plurality of" means at least two, for example, two, three, and the like.

In this application, unless otherwise expressly stated and defined, the terms "connect", "fix" and the like shall be understood in a board sense, for example, "fix" may be fixed connection or detachable connection or integrated connection; it may be mechanical connection or electrical connection; it may be direct connection or indirect connection via an intermediate, or it may be internal connection or interaction of two components, unless otherwise specified. Those of ordinary skill in the art can understand specific meanings of these terms in the present application according to specific situations.

In this application, the drawings are merely for explanatory purposes; the dimensions and shapes involved therein are only representations of one embodiment and shall not be deemed as limiting the scope of protection of the claims.

In addition, the technical solutions of the embodiments of this application may be combined with one another based on implementation by those of ordinary skill in the art. When the technical solutions contradict each other in combination or may not be realized, it is to be considered that there is no combination of the technical solutions, that shall not fall into the protection scope of this application.

As shown in FIG. 1, FIG. 1 is a flow diagram of a method for forming a thermal insulation mat provided by this application. The method includes:

S1, a certain number of fabrics, adhesive layers, and aluminum foils with coatings are provided;

S2, a hot press is provided, which is configured to hot-press the fabrics, adhesive layers, and aluminum foils with coatings into a first thermal insulation layer;

S3, the first thermal insulation layer is cut to form an upper thermal insulation sheet and a lower thermal insulation sheet;

S4, a certain number of nitrile rubber, polyvinyl chloride, and auxiliary agents are provided;

S5, the nitrile rubber is mixed with the polyvinyl chloride to form a blend, and the blend and the auxiliary agents are vulcanized and foamed at a preset temperature for preset time and cooling the same for preset time to form a rubber-plastic material;

S6, the rubber-plastic material and the aluminum foil are processed into a second thermal insulation layer with a preset thickness;

S7, a positioning clamp is provided, which is configured to fix, laminate, and align the upper thermal insulation sheet, the second thermal insulation layer, and the lower thermal insulation sheet to form a main body of the mat;

S8, a sewing machine is provided, and stitching sewing is performed on a surface of the main body of the mat to form a folded edge of the mat;

S9, a cutting tool device is provided to process the main body of the mat to a size with preset width and length;

S10, the upper thermal insulation sheet, the second thermal insulation layer, and the lower insulation sheet are stitched again by the sewing machine along peripheral edges of the main body of the mat; and S11, a connecting strip is sewn by the sewing machine along the edges of the main body of the mat to form a peripheral edge of the mat, so as to fix the upper thermal insulation sheet, the second thermal insulation layer, and the lower thermal insulation sheet.

It should be noted that in this application, the above labels such as S1, S2, and S3 are only used to facilitate understanding of the relationship between the method steps and to simplify the labeling in the drawings, and do not uniquely limit the sequence of the steps.

In an embodiment of this application, tight bonding between materials is achieved by means of hot-pressing by the hot press (steps S2 and S6). Matched with lamination and alignment (step S7) by the positioning clamp and double-thread overlock stitching by the sewing machine (steps S8, S10, and S11), the thermal insulation mat with a stable structure is formed, and the high-temperature layering problem is solved.

For example, in a home kitchen, a high-temperature stir-fry pan or casserole pot needs to be placed on a table board or high-temperature kitchenware is placed on a heating mat after cooking every day, which easily induces temperature rise of the table board. A conventional thermal insulation mat is prone to deformation and is insufficient in thermal insulation. By using this thermal insulation mat, most thermal radiation is reflected by a surface aluminum foil, and the middle rubber-plastic material blocks heat conduction, such that the temperature of the table board is decreased by 45-60% compared to the temperature when the thermal insulation mat is not used. Moreover, the thermal insulation mat is effective for a long time and solves the high-temperature aging and layering problem.

In an embodiment of this application, by arranging the folded edge formed by surface stitching, the thermal insulation mat may be folded many times in a longitudinal direction to adapt to conventional drawer storage, thereby saving the occupied space.

It is to be noted that in S1, a certain number of coatings is provided. This coating may be made of various coating materials such as polyethylene (PE), polyurethane (PU), thermoplastic polyurethane (TPU), polyvinyl chloride (PVC), polyethylene glycol terephthalate (PET), and the like. Polymer coatings with similar function have the characteristics of waterproofness, oilproofness, weather resistance, and the like, which are all within the scope of this embodiment. In this embodiment, the coating is preferably a PE coating. The PE coating features excellent waterproofness, chemical corrosion resistance, and relatively low thermal conductivity, such that the first thermal insulation layer has the characteristics of waterproofness, oilproofness, scrubbing performance, and thermal insulation.

It is to be noted that in S1, a certain number of fabrics is provided. The fabric may be an oxford fabric or a canvas. Both the oxford fabric and the canvas are high-strength woven fabrics, a common feature of which meets a functional requirement of a surface layer of the thermal insulation mat. Both the oxford fabric and the canvas can bear hot-pressing lamination (such as 180-220° C.) and mechanical stress due to long-term folding storage. The oxford fabric and the canvas have a certain porosity and can form a mechanical engagement with coating materials such as PE and PU, thereby avoiding coating detachment in subsequent use. In this embodiment, the fabric is preferably the oxford fabric.

Figure 2:
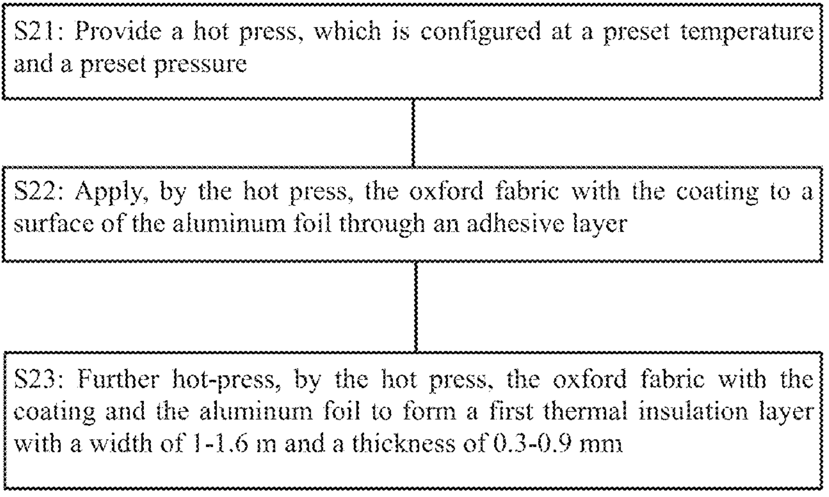
FIG. 2 is a flow chart of a step S2 in an embodiment provided by this application.

As shown in FIG. 2, FIG. 2 is a flow chart of a step S2 in an embodiment provided by this application. The step S2 includes:

S21, a hot press is provided, which is configured at a preset temperature and a preset pressure;

S22, the hot press applies the oxford fabric with the coating to a surface of the aluminum foil through an adhesive layer;

S23, the hot press further hot-presses the oxford fabric with the coating and the aluminum foil to form a first thermal insulation layer with a width of 1-1.6 m and a thickness of 0.3-0.9 mm.

In the above hot-pressing process, textures with any surface may further be pressed, for example, various shapes such as a circle, a triangle, a polygon, a sloping texture, an irregular texture, and a straight texture.

Any texture on the surface of the first thermal insulation layer may offset the interlayer stress, reduce heat conduction, accelerate heat dissipation, and hidden scratches.

For example, in an actual usage scenario, in the process that the mat is unfolded and folded frequently, various scratches and wrinkles are easily formed on the surface of the mat, and a substantially flat surface cannot be maintained in each folded area during long-term use. In this case, the concave-convex structure of any texture on the surface of the first thermal insulation layer can partially fill or cover shallow scratches to maintain the overall consistency of the surface.

It should be noted that the preset temperature is 200-240° C., and the preset pressure is 0.5-1.5 MPa.

It should be noted that the width of the first thermal insulation layer is a fabric width, and the thickness thereof is the shortest distance between the upper surface and the lower surface of the first thermal insulation layer, similarly hereinafter.

In this case, the first thermal insulation layer consists of the upper thermal insulation sheet and the lower insulation sheet, the thickness of the first thermal insulation layer is equivalent to the thickness of the oxford fabric aluminum foil which is 0.3-0.9 mm, and a lower limit of the processing thickness is set to be 0.3 mm, which, on the one hand, guarantees the basic strength of the first thermal insulation layer to prevent the fabric from stretching deformation when being hot-pressing lamination since the first thermal insulation layer is too thin, and on the other hand, satisfies the substrate support required for coating attachment. An upper limit of the processing thickness of the first thermal insulation layer is set to be 0.9 mm, such that the overall weight may be controlled, ensuring the thermal insulation mat foldable and storable and preventing an increase in the hot-pressing process due to excessive thickness. In an embodiment, the thickness of the first thermal insulation layer is preferably 0.5 mm.

The coating fabric and the aluminum foil composite layer have the waterproof and oilproof characteristics, and stains are easily scrubbed.

Figure 3:
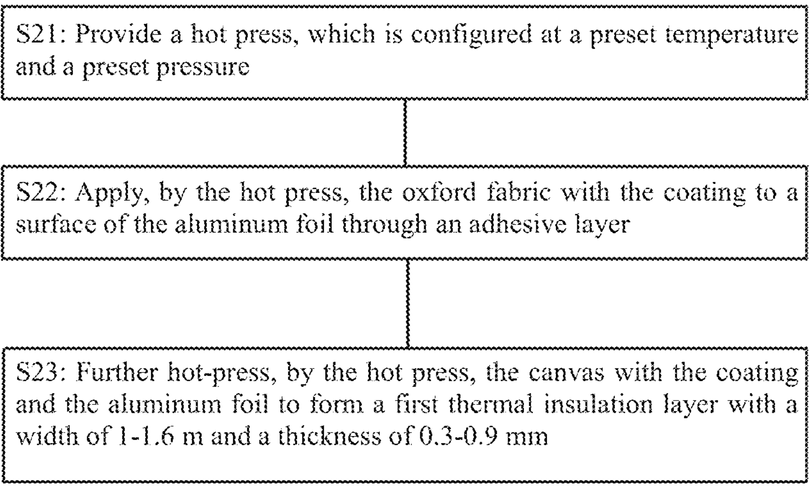
FIG. 3 is a flow chart of a step S2 in another embodiment provided by this application.

As shown in FIG. 3, FIG. 3 is a flow chart of a step S2 in another embodiment provided by this application. The step S2 includes:

S21, a hot press is provided, which is configured at a preset temperature and a preset pressure;

S22, the hot press applies the oxford fabric with the coating to a surface of the aluminum foil through an adhesive layer;

S23, the hot press further hot-presses the canvas with the coating and the aluminum foil to form a first thermal insulation layer with a width of 1-1.6 m and a thickness of 0.3-0.9 mm.

In the above hot-pressing process, any textures on the surface of the first thermal insulation layer may further be pressed, for example, various shapes such as a circle, a triangle, a polygon, a sloping texture, an irregular texture, and a straight texture.

It should be noted that the preset temperature is 200-240° C., and the preset pressure is 0.5-1.5 MPa.

In this case, the first thermal insulation layer consists of the upper thermal insulation sheet and the lower insulation sheet, the thickness of the first thermal insulation layer is equivalent to the thickness of the canvas aluminum foil, which is 0.3-0.9 mm. This fabric has waterproof and oilproof effects as well as an anti-stain effect, and is easily scrubbed and good in thermal insulation effect. In an embodiment, the thickness of the first thermal insulation layer is preferably 0.5 mm.

In this embodiment, different from another embodiment, the material of this fabric is a canvas material.

As shown in FIG. 4, FIG. 4 is a flow diagram of a step S3, including:

S3, the first thermal insulation layer is cut to form an upper thermal insulation sheet and a lower thermal insulation sheet.

In this case, cutting the first thermal insulation layer refers to splitting the first thermal insulation layer into two sheet materials, so as to form an upper thermal insulation sheet and a lower thermal insulation sheet.

As shown in FIG. 5, FIG. 5 is a flow diagram of a step S4, including:

S4, a certain number of nitrile rubber, polyvinyl chloride, and auxiliary agents are provided;

it should be noted that the auxiliary agent includes a foaming agent, a filler, a stabilizer, a flame retardant, and the like.

Figure 6:
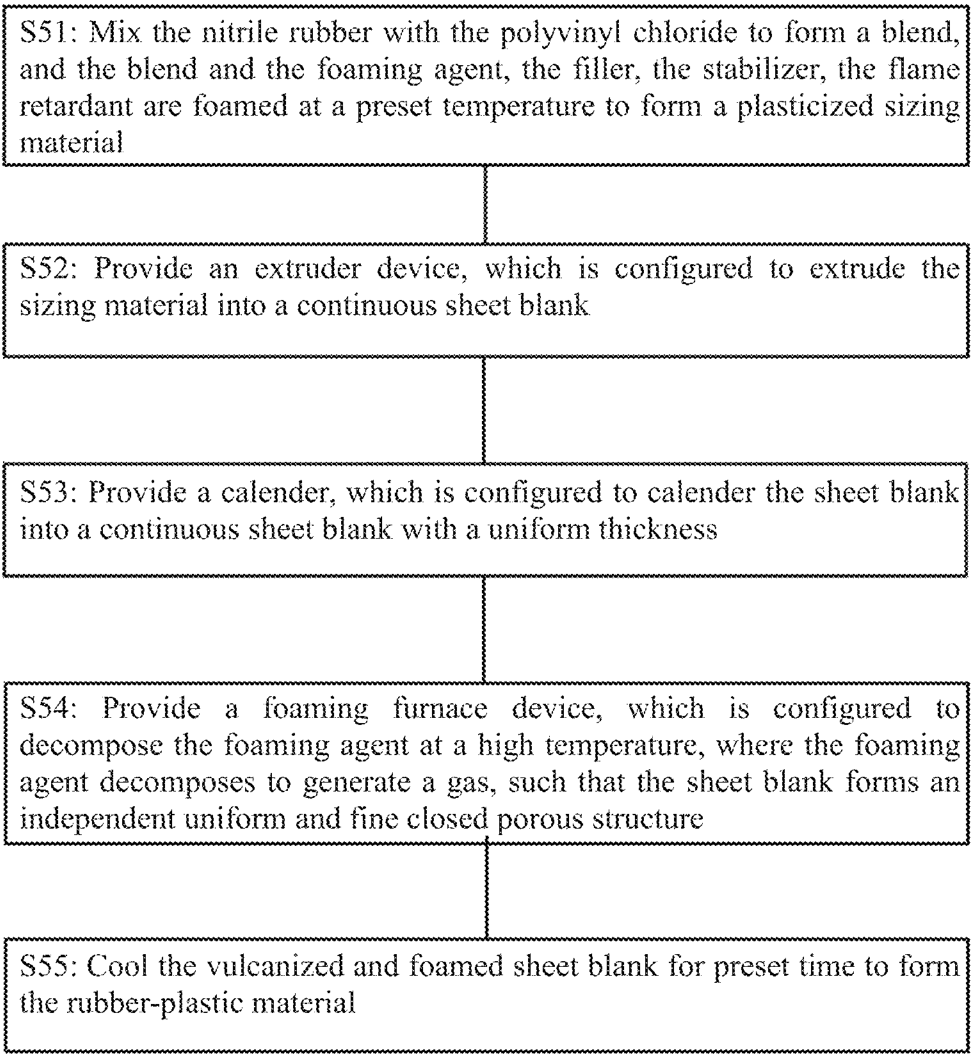
FIG. 6 is a flow diagram of a step S5.

As shown in FIG. 6, FIG. 6 is a flow diagram of a step S5, including:

S51, the nitrile rubber is mixed with the polyvinyl chloride to form a blend, and the blend and the foaming agent, the filler, the stabilizer, and the flame retardant are foamed at a preset temperature to form a plasticized sizing material;

S52, an extruder device is provided, which is configured to extrude the sizing material into a continuous sheet blank;

S53, a calender is provided, which is configured to calender the sheet blank into a continuous sheet blank with a uniform thickness;

S54, a foaming furnace device is provided, which is configured to decompose the foaming agent at a high temperature, where the foaming agent decomposes to generate a gas, such that the sheet blank forms an independent uniform and fine closed porous structure; and S55, the vulcanized and foamed sheet blank is cooled for preset time to form the rubber-plastic material.

The rubber-plastic material is a flexible material and has micropores. The micropores in the surface of the rubber-plastic material can block heat conduction, enhance the flexibility, resist compressive deformation, and block water vapor permeation.

Figure 7:
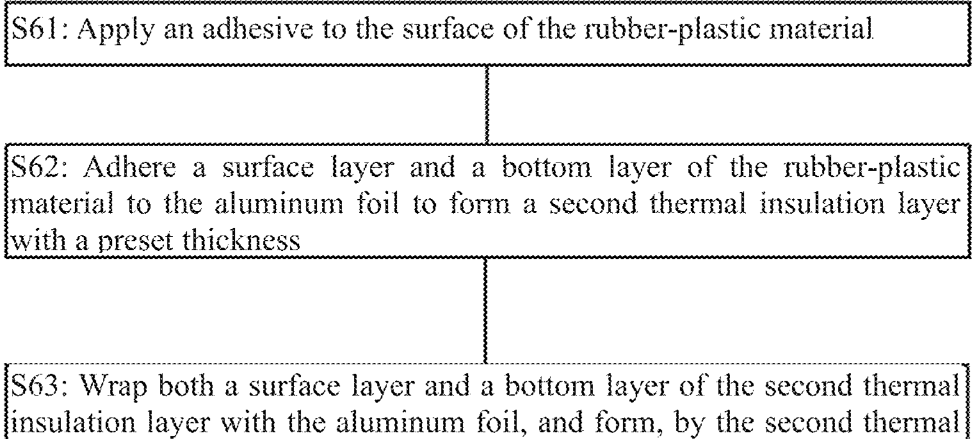
FIG. 7 is a flow diagram of a step S6.

As shown in FIG. 7, FIG. 7 is a flow diagram of a step S6, including:

S61, an adhesive is applied to the surface of the rubber-plastic material;

S62, a surface layer and a bottom layer of the rubber-plastic material are adhered to the aluminum foil to form a second thermal insulation layer with a preset thickness; and S63, both a surface layer and a bottom layer of the second thermal insulation layer are wrapped with the aluminum foil, and the second thermal insulation layer forms the second thermal insulation layer of the mat.

The thickness of the aluminum foil is 7-12 μm, and the thickness of the second thermal insulation layer is 3-12 mm.

In this case, the second thermal insulation layer is an inner fabric, sandwiched inside the first thermal insulation layer. The thickness of the second thermal insulation layer is 3-12 mm, and the lower limit of the thickness is 3 mm to ensure flexibility, which facilitates folding. The upper limit of the thickness is 12 mm, such that the rigidity of the structure can be maintained, and the piercing risk due to excessive thickness can also be avoided. In this embodiment, the thickness of the second thermal insulation layer is 5 mm.

The micropores in the surface layer and the bottom layer of the rubber-plastic material are adhered to the aluminum foil, which may be processed by means of glue or hot-pressing.

The aluminum foil is laminated on the surface layer and the bottom layer of the rubber-plastic material to form a double-sided reflecting layer. Compared with a single-sided aluminum foil design, radiation heat transfer is reduced. The second thermal insulation layer forms a continuous sealing layer between the aluminum foil and the rubber-plastic material, which is difficult for water vapor to penetrate, thereby avoiding attenuation of the thermal insulation performance due to moisture absorption of the rubber-plastic material.

As shown in FIG. 8, FIG. 8 is a flow diagram of a step S7, including:

S71, a positioning clamp is provided, which receives the upper thermal insulation sheet, the second thermal insulation layer, and the lower thermal insulation sheet; and S72, the upper thermal insulation sheet, the second thermal insulation layer, and the lower thermal insulation sheet are fixed, laminated, and aligned to form a main body of the mat.

In this case, the main body of the mat is of a three-layer structure, where the upper thermal insulation sheet thereof is the canvas aluminum foil or the oxford fabric aluminum foil, and the lower thermal insulation sheet thereof is the canvas aluminum foil or the oxford fabric aluminum foil, with high rigidity. The second thermal insulation layer is a rubber-plastic aluminum foil, which is made of a flexible material and is easy to fold. The three form the main body of the thermal insulation mat.

As shown in FIG. 9, FIG. 9 is a flow diagram of a step S8, including:

S8, a sewing machine is provided, and stitching sewing is performed on a surface of the main body of the mat to form a folded edge of the mat.

In this case, the stitching thread penetrates through the upper thermal insulation sheet, the middle thermal insulation layer, and the lower thermal insulation sheet to form the folded edge of the mat, and the folded edge is fixed to the upper thermal insulation sheet, the middle thermal insulation layer, and the lower thermal insulation sheet, such that the mat is not easily deformed.

It should be noted that the predetermined trajectory may be in a shape of a parallel vertical reference line for spacing, cross shape, which is convenient for the user to fold. In this embodiment, the shape of the folded edge is the parallel vertical reference line for spacing to divide the mat into a plurality of rectangles.

As shown in FIG. 10, FIG. 10 is a flow diagram of a step S9, including:

S9, a cutting tool device is provided to process the main body of the mat to a size with preset width and length;

in this case, the cutting tool device performs blank cutting according to a predetermined size to process the mat with the size of an actual finished product. The predetermined width and length of the actual finished product may be selected according to the practical situation of the user, which is not specifically limited. In this embodiment, the predetermined length of the actual finished product is 30-110 cm, and the predetermined width thereof is 30-45 cm.

As shown in FIG. 11, FIG. 11 is a flow diagram of a step S10, including:

S10, the upper thermal insulation sheet, the second thermal insulation layer, and the lower insulation sheet are stitched again by the sewing machine along peripheral edges of the main body of the mat.

As shown in FIG. 12, FIG. 12 is a flow diagram of a step S11, including:

S11, a connecting strip is sewn by the sewing machine along the edges of the main body of the mat to form a peripheral edge of the mat, so as to fix the upper thermal insulation sheet, the second thermal insulation layer, and the lower thermal insulation sheet.

In this case, the stitching thread penetrates through the upper thermal insulation sheet, the middle thermal insulation layer, and the lower thermal insulation sheet to fix the connecting strip, so as to form the folded edge of the mat, and the folded edge is fixed to the upper thermal insulation sheet, the middle thermal insulation layer, and the lower thermal insulation sheet, such that the mat is not easily deformed.

Figure 13:
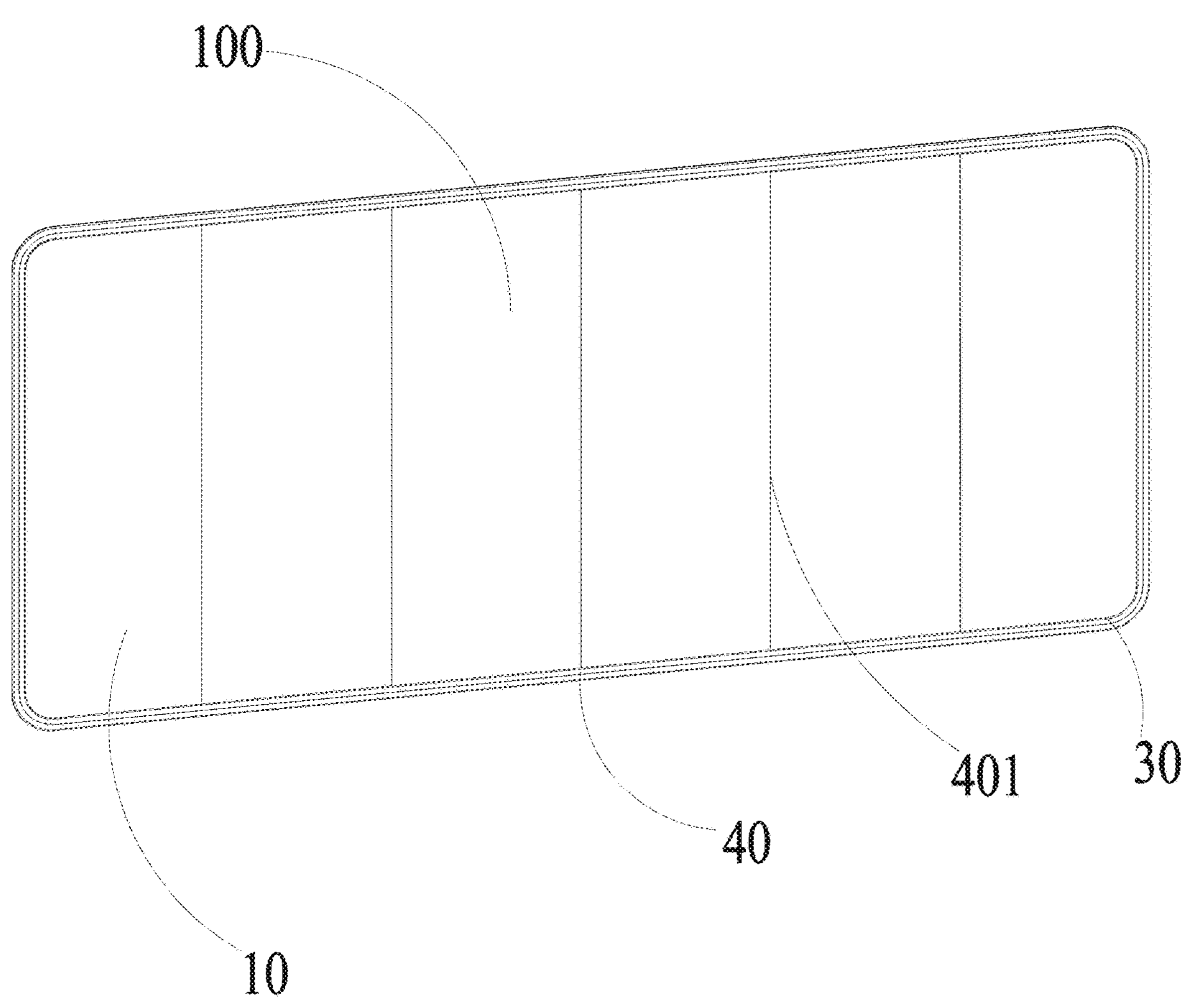
FIG. 13 is a schematic structural diagram of a thermal insulation mat provided by this application.
Figure 14:
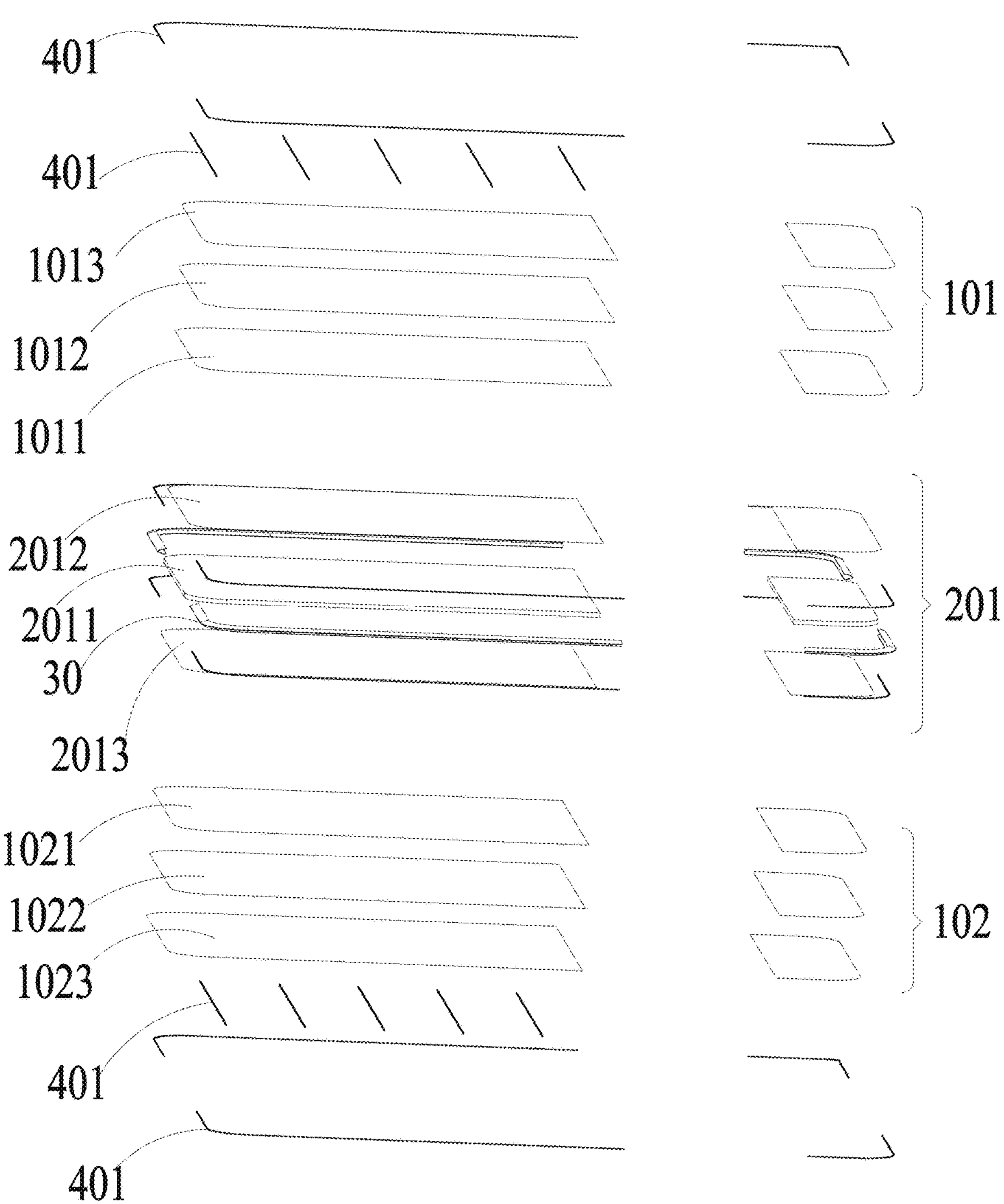
FIG. 14 is an exploded structural diagram of a thermal insulation mat provided by this application.
Figure 15:
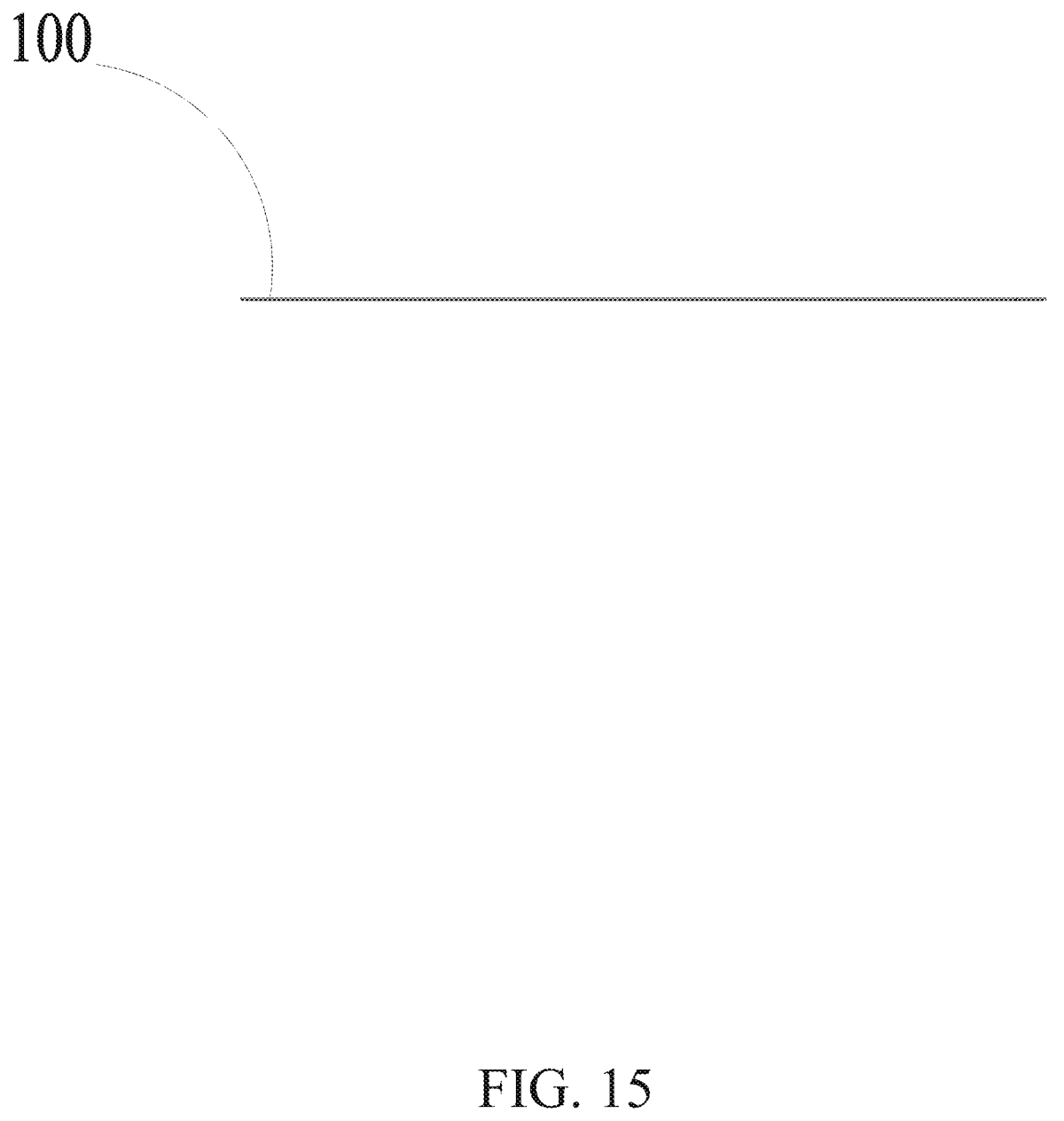

As shown in FIG. 13, FIG. 14, and FIG. 15, FIG. 13 is a schematic structural diagram of a thermal insulation mat provided by this application. FIG. 14 is an exploded structural diagram of a thermal insulation mat provided by this application. FIG. 15 is a side structural schematic view of a thermal insulation mat provided by this application.

The thermal insulation mat 100 is formed by any one method for forming a thermal insulation mat. All methods for forming a thermal insulation mat may be applied to a thermal insulation mat 100, which, therefore, is not described repeatedly. The thermal insulation mat 100 includes a main body portion, at least one folded portion, and edge portions, where the edge portions are arranged at edges of the main body portion, and the folded portion penetrates through the main body portion;

The main body portion includes a first thermal insulation layer 10 and a second thermal insulation layer 20. The first thermal insulation layer 10 includes an upper thermal insulation sheet 101 and a lower thermal insulation sheet 102. The second thermal insulation layer 20 is a middle thermal insulation layer 201, and the middle thermal insulation layer 201 is sandwiched between the upper thermal insulation sheet 101 and the lower thermal insulation sheet 102.

The folded portion 40 includes at least one stitching thread 401, the stitching thread 401 extends along the main body portion from one edge portion to another edge portion and penetrates through the main body portion; and a thickness of the folded portion is less than a thickness of the main body portion;

the edge portion is a connecting strip 30, the middle thermal insulation layer 201 is sandwiched between the upper thermal insulation sheet 101 and the lower thermal insulation sheet 102 by the connecting strip 30, and the connecting strip 30 is in a manner of woven fabric fixation, edge-wrapping fixation, adhesion, and the like. In this application, by way of woven fabric fixation, the middle thermal insulation layer 201 is sandwiched between the upper thermal insulation sheet 101 and the lower thermal insulation sheet 102.

As shown in FIG. 13 and FIG. 14, the upper thermal insulation sheet 101 is a surface layer of the thermal insulation mat. The upper thermal insulation sheet 101 is configured as a surface of the mat and configured as a contact heat source; the upper thermal insulation sheet consists of a fabric 1011, a coating 1012, and an aluminum foil 1013, the upper thermal insulation sheet 101 includes an outer surface and an inner surface, the outer surface and the inner surface are arranged opposite to each other, the aluminum foil 1013, the coating 1012, and the fabric 1011 are superposed from outside to inside in sequence between the outer surface and the inner surface, and the aluminum foil 1013, the coating 1012, and the fabric 1011 are formed by a hot pressing process; and the aluminum foil 1013 forms the outer surface, the fabric 1011 forms the inner surface, and the coating 1012 is sandwiched between the outer surface and the inner surface.

It should be noted that this fabric may be an oxford fabric or canvas or plain weave fabric. In this embodiment, this fabric is preferably the oxford fabric.

It is to be noted that in this coating 1012 may be made of various coating materials such as polyethylene (PE), polyurethane (PU), thermoplastic polyurethane (TPU), polyvinyl chloride (PVC), polyethylene glycol terephthalate (PET), and the like. Polymer coatings with similar function have the characteristics of waterproofness, oilproofness, weather resistance, and the like, which are all within the scope of this embodiment. The surface layer of the thermal insulation mat 100 is a substantially flat smooth surface and is configured to place a hot article. In an actual application scenario, the hot article may be tableware, dishes, or the like.

In this application, a texture is formed on the surface of the upper thermal insulation sheet 101 and includes a concave area (not shown in the figure) and a convex area (not shown in the figure), the concave area and the convex area are arranged adjacent to each other, and a shape of the convex area may be in various shapes of a circle, a triangle, a polygon, a sloping texture, an irregular shape, and a straight texture. Any texture on the outer surface may offset the interlayer stress, reduce heat conduction, accelerate heat dissipation, and hidden scratches.

As shown in FIG. 14, the lower thermal insulation sheet 102 is a bottom layer of the mat, is configured to contact a tabletop, and is arranged opposite to the upper thermal insulation sheet 101. The lower thermal insulation sheet 102 consists of a fabric 1021, a coating 1022, and an aluminum foil 1023, the lower thermal insulation sheet 102 includes an outer surface and an inner surface, the outer surface and the inner surface are arranged opposite to each other, the aluminum foil 1023, the coating 1022, and the fabric 1021 are superposed from outside to inside in sequence between the outer surface and the inner surface, and the aluminum foil 1023, the coating 1022, and the fabric 1021 are formed by a hot pressing process; and the aluminum foil 1023 forms the outer surface, the fabric 1021 forms the inner surface, and the coating 1022 is sandwiched between the outer surface and the inner surface.

It should be noted that the upper thermal insulation sheet 101 and the lower thermal insulation sheet 102 are substantially the same in shape, size, and material.

It should be noted that this fabric may be an oxford fabric or canvas or plain weave fabric. In this embodiment, this fabric is preferably the oxford fabric.

It is to be noted that in this coating 1022 may be made of various coating materials such as polyethylene (PE), polyurethane (PU), thermoplastic polyurethane (TPU), polyvinyl chloride (PVC), polyethylene glycol terephthalate (PET), and the like. Polymer coatings with similar function have the characteristics of waterproofness, oilproofness, weather resistance, and the like, which are all within the scope of this embodiment.

In this application, a texture is also formed on the outer surface of the lower thermal insulation sheet 102, for example, in various shapes such as a circle, a triangle, a polygon, a sloping texture, an irregular texture, and a straight texture. Any texture on the surface may offset the interlayer stress, reduce heat conduction, accelerate heat dissipation, and hidden scratches.

The upper thermal insulation sheet 101 and the lower thermal insulation sheet 102 form a top surface and a bottom surface of the mat 100, and the top surface and the bottom surface of the thermal insulation mat have the same length and width.

As shown in FIG. 13 and FIG. 14, the second thermal insulation layer 20 is the middle thermal insulation layer 201, is made of a flexible material, and consists of a rubber-plastic material 2011, a second aluminum foil 2012, and a third aluminum foil 2013. The second aluminum foil 2012, the rubber-plastic material 2011, and the third aluminum foil 2013 are arranged in sequence, and the second aluminum foil 2012, the rubber-plastic material 2011, and the third aluminum foil 2013 are all of sheet structures. The rubber-plastic material 2011 is sandwiched between the second aluminum foil and the third aluminum foil.

The second aluminum foil, the rubber-plastic material, and the third aluminum foil are substantially the same in shape and size. The rubber-plastic material 2011 is a flexible material, which is formed by vulcanizing and foaming nitrile rubber, polyvinyl chloride, and the foaming agent mixed at a mass ratio. The surface thereof has micropores, and the micropores in the surface of the rubber-plastic material 2011 can block heat conduction, enhance the flexibility, resist compressive deformation, and block water vapor permeation.

The second aluminum foil 2012 and the third aluminum foil 2013 are laminated on the surface layer and the bottom layer of the rubber-plastic material 2011 to form a double-sided reflecting layer. Compared with a single-sided aluminum foil design, radiation heat transfer is reduced. A continuous sealing layer is formed between the aluminum foil and the rubber-plastic material 2011, which is difficult for water vapor to penetrate, thereby avoiding attenuation of the thermal insulation performance due to moisture absorption of the rubber-plastic material.

In an embodiment, the thickness of the rubber-plastic material 2011 is 3-9 mm, the thickness of the second aluminum foil 2012 and the third aluminum foil 2013 is 7-12 μm, and the total thickness of the second thermal insulation layer 201 formed by laminating the rubber-plastic material 2011 and the aluminum foil is 3-12 mm. The lower limit of the thickness is 3 mm to ensure the flexibility, which facilitates folding. The upper limit of the thickness is 12 mm, such that the rigidity of the structure can be maintained, and the piercing risk due to excessive thickness can also be avoided. In this embodiment, the thickness of the second thermal insulation layer is 5 mm.

In an embodiment, in order to manufacture the upper thermal insulation sheet 101, the middle thermal insulation layer 201, and the lower thermal insulation sheet 102 into a product mat 100, the upper thermal insulation sheet 101 and the lower thermal insulation sheet 102 wrap the middle thermal insulation layer 201 through the woven fabric 30 by the sewing machine, so as to apply the middle thermal insulation layer 201 to an inner layer of the thermal insulation mat 100.

As shown in FIG. 15, in this case, the thickness of the product mat 100 is only 3-15 mm, such that the mat is conveniently folded and easily stored.

In an embodiment, the mat 100 is configured to, when tableware is used in a heating area of a table, add the mat between the table and the tableware. When hot tableware or heating product is used on the heat-sensitive table surface, a relatively low temperature of the table is maintained.

Referring to FIG. 13, in an embodiment, the mat 100 is divided by the stitching thread 401 into 6 areas, each area is in a shape of a substantially flat rectangle, and each area is connected through the folded edge of the stitching thread 401.

In an actual application scenario, the thermal insulation mat 100 is suitable when 3-8 persons in a family have a meal. The bottom layer is attached to the disk or the heating mat, and the upper surface is configured to place tableware or hot dishes, so as to maintain an appropriate temperature, thereby preventing the tabletop from being overheated.

For example, for daily meals of a family with 3-8 persons, main dinner bowls, soup bowls, plates, and water cups may be respectively placed in six areas to form an ordered dining layout. When the mat is used with a tabletop heating mat in winter, a cracking risk due to local overheat of the tabletop is avoided. For another example, the mat may serve as a temporary placement mat next to a cooking bench to prevent the table board from being damaged. For another example, in an outdoor picnic scenario, matched with a waterproof surface layer design, the mat is suitable for variable outdoor environments.

Figure 16:
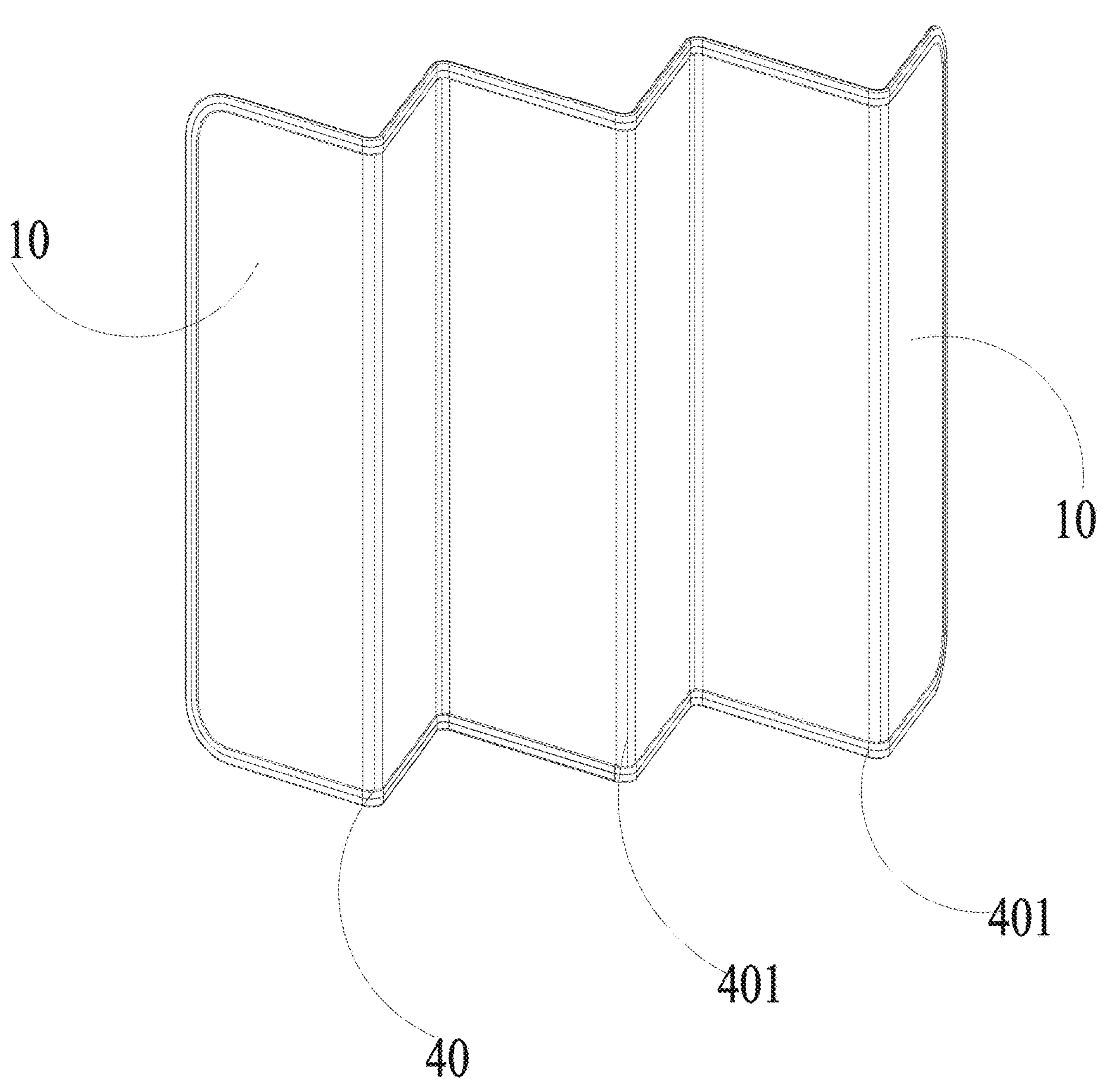
FIG. 16 is a schematic diagram of a thermal insulation mat provided by this application in a semi-unfolded state.

Referring to FIG. 16, FIG. 16 is a schematic diagram of a thermal insulation mat provided by this application in a semi-unfolded state. In an embodiment, the thermal insulation mat 100 is divided into 6 areas by the stitching thread, each area is in a shape of a substantially flat rectangle, and after being folded along the folded portion, the main body portion is divided into a plurality of rectangles along the folded portion. In an actual application scenario, the user may be quickly folded and stored along the folded portion 40 without violently compressing the thermal insulation mat, such that the storage time is shortened.

Figure 17:
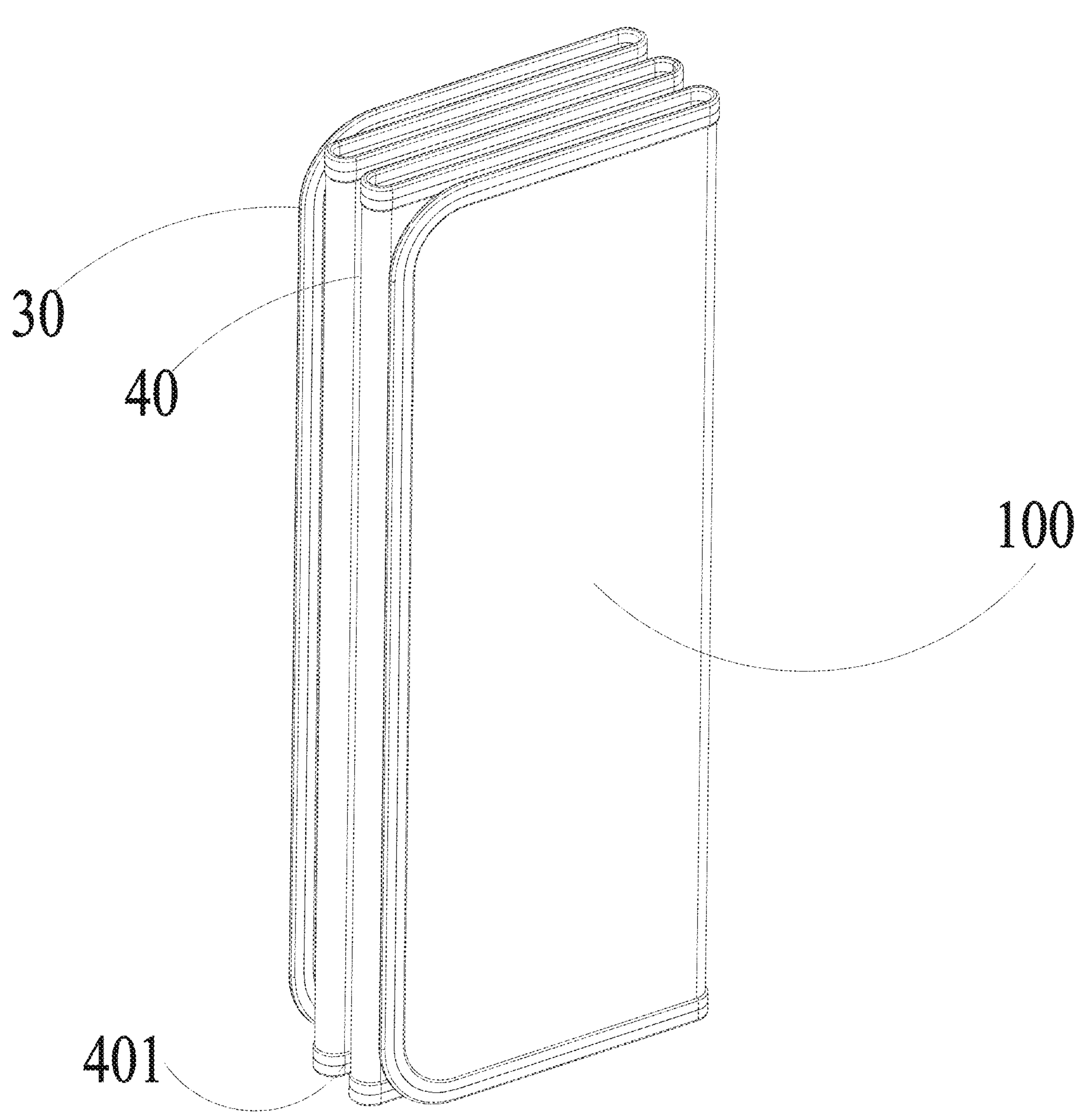
FIG. 17 is a schematic diagram of a thermal insulation mat provided by this application in a folded state.

Referring to FIG. 17, FIG. 17 is a schematic diagram of a thermal insulation mat provided by this application in a folded state.

As shown in FIG. 17, the mat 100 is in a completely folded state. Each area is in a shape of a substantially flat rectangle. The connecting strip 30 and the stitching thread 401 are applied to each side of each outer edge to fix the second thermal insulation layer 20 to the inner layer of the first thermal insulation layer 10 without displacement.

In an actual application scenario, the user may quickly fold and store the mat in size and shape of a rectangular area along the folded portion 40. The user may place the mat in a cabinet or a certain corner, such that the volume occupied by storage is reduced. On the other hand, during outdoor dining, the transportation volume may be saved, and the mat is conveniently carried.

Referring to FIG. 17 and FIG. 18 together, FIG. 18 is an exploded structural diagram of a thermal insulation mat provided by this application from another perspective. In order to better fix the upper thermal insulation sheet 101, the second thermal insulation layer 20, and the lower thermal insulation sheet 102, the mat 100 is stitched totally 3 times. During first-time stitching, the upper thermal insulation sheet 101, the second thermal insulation layer 20, and the lower thermal insulation sheet 102 are fixed by the stitching thread 401 through the folded portion 40. During second-time stitching, the edges around the upper thermal insulation sheet 101, the second thermal insulation layer 20, and the lower thermal insulation sheet 102 are fixed through the stitching thread 401. During third-time stitching, the edges around the upper thermal insulation sheet 101, the second thermal insulation layer 20, and the lower thermal insulation sheet 102 are stitched by an edge-wrapping woven tape 30. Through stitching of over 3 times, the connecting strip 30 and the stitching thread 401 are applied to each side of each outer edge of the mat 100 to fix the second thermal insulation layer to the inner layer of the second thermal insulation layer without displacement. Moreover, the folded portion 40 is formed through the stitching thread 401, which is easy to store and fold.

Figure 19:
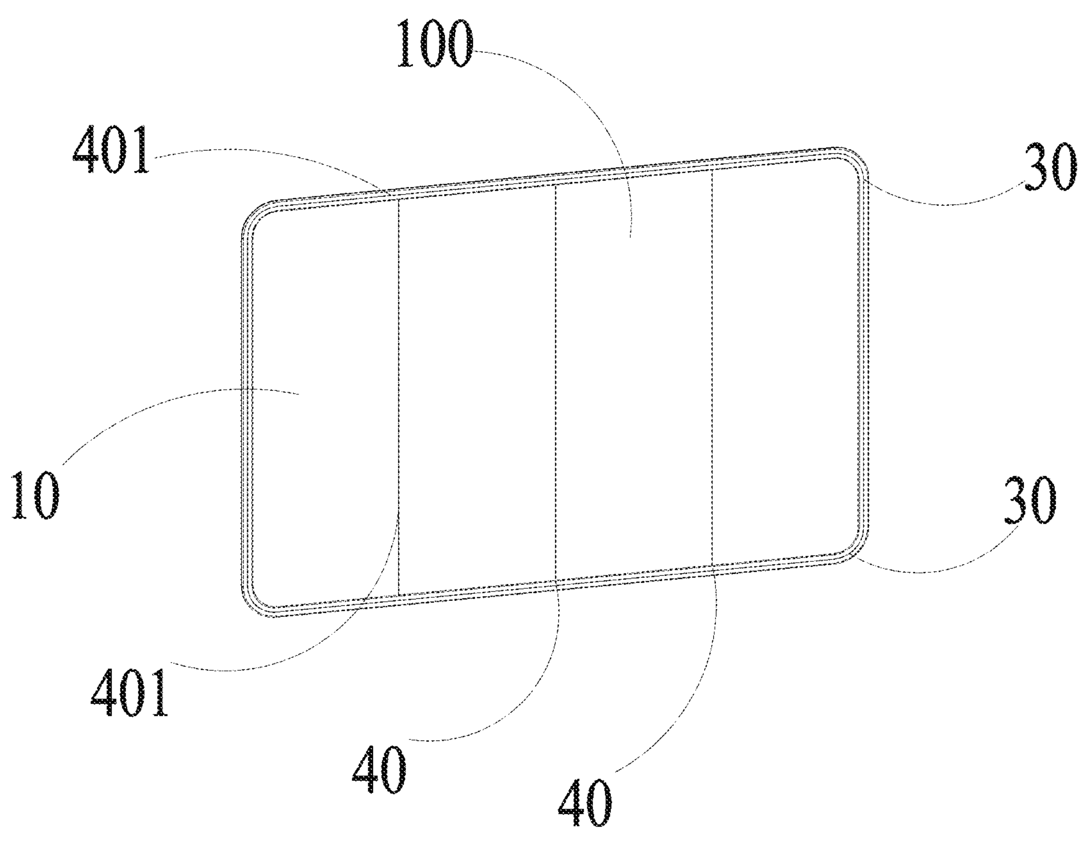
FIG. 19 is a schematic diagram of a thermal insulation mat provided by yet another embodiment of this application in an unfolded state.

Referring to FIG. 19, FIG. 19 is a schematic diagram of a thermal insulation mat provided by yet another embodiment of this application in an unfolded state. In an embodiment, the thermal insulation mat 100 is divided into 4 areas by the stitching thread. Each area is in a shape of a substantially flat rectangle. Each area is connected through the folded edge 40 of the stitching thread 401. In an actual application scenario, the thermal insulation mat 100 is suitable when 1-2 persons in a family have a meal. The bottom layer is attached to the disk or the heating mat, and the upper surface is configured to place tableware or hot dishes, so as to maintain an appropriate temperature, thereby preventing the tabletop from being overheated.

For example, for daily meals of a family with 1-2 persons, main dinner bowls, soup bowls, plates, and water cups may be respectively placed in six areas to form an ordered dining layout. When the mat is used with a tabletop heating mat in winter, a cracking risk due to local overheat of the tabletop is avoided. For another example, the mat may serve as a temporary placement mat next to a cooking bench to prevent the table board from being damaged. For another example, in an outdoor picnic scenario, matched with a waterproof surface layer design, the mat is suitable for variable outdoor environments.

Figure 20:
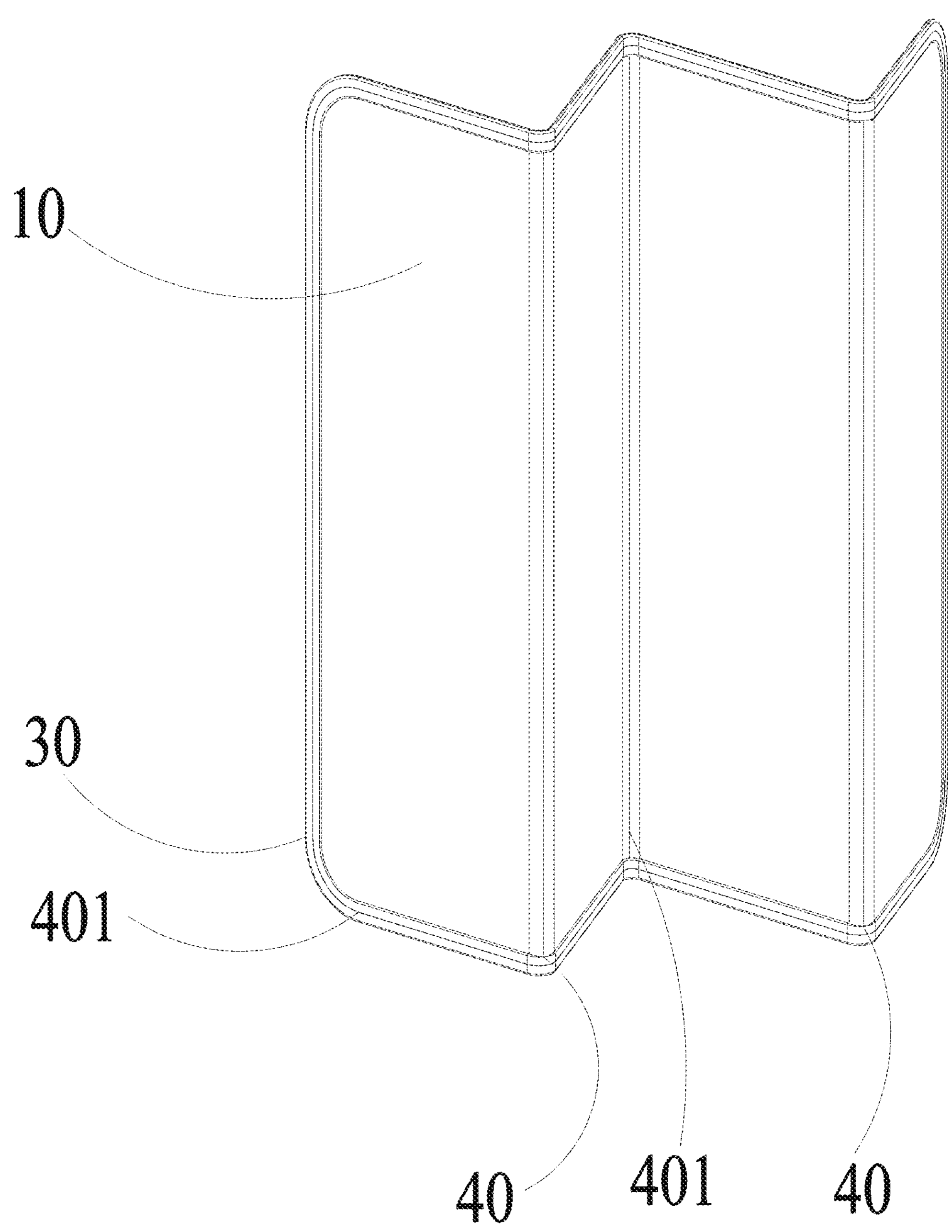
FIG. 20 is a schematic diagram of a thermal insulation mat provided by yet another embodiment of this application in a semi-unfolded state.

Referring to FIG. 20, FIG. 20 is a schematic diagram of a thermal insulation mat provided by yet another embodiment of this application in a semi-unfolded state. In an embodiment, the thermal insulation mat 100 is divided by the stitching thread 401 into 4 areas, each area is in a shape of a substantially flat rectangle, and each area is connected through the folded edge 40 of the stitching thread 401. In an actual application scenario, the user may be quickly folded and stored along the folded edge 40 without violently compressing the thermal insulation mat, such that the storage time is shortened.

Figure 21:
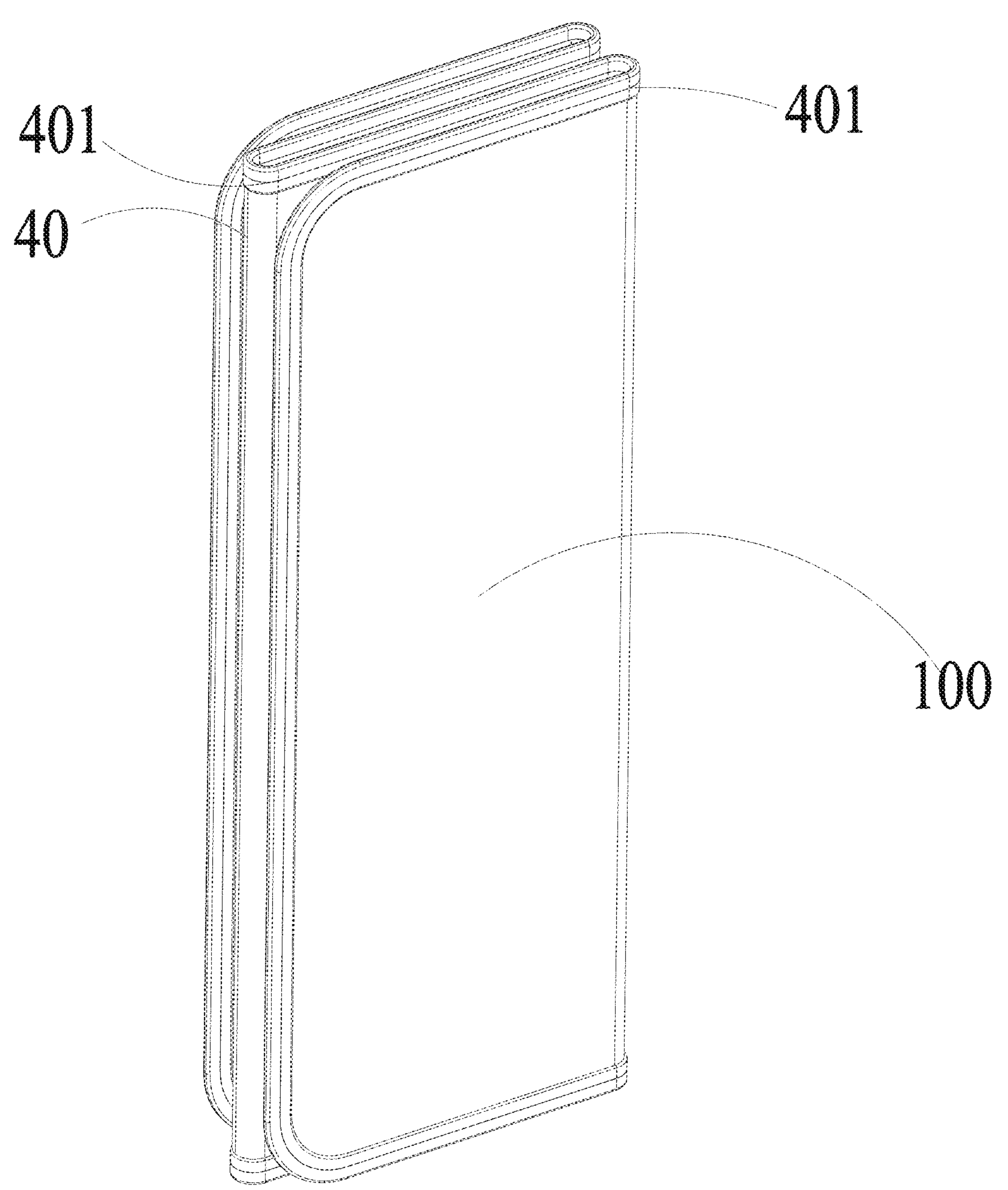
FIG. 21 is a schematic diagram of a thermal insulation mat provided by yet another embodiment of this application in a folded state.

Referring to FIG. 21, FIG. 21 is a schematic diagram of a thermal insulation mat provided by yet another embodiment of this application in a folded state. In an embodiment, the thermal insulation mat 100 is divided by the stitching thread 401 into 4 areas, each area is in a shape of a substantially flat rectangle, and each area is connected through the folded edge 40 of the stitching thread 401. In an actual application scenario, the user may quickly fold and store the mat in size and shape of a rectangular area along the folded edge 40. The user may place the mat in a cabinet or a certain corner, such that the volume occupied by storage is reduced. On the other hand, during outdoor dining, the transportation volume may be saved, and the mat is conveniently carried.

Figure 22:
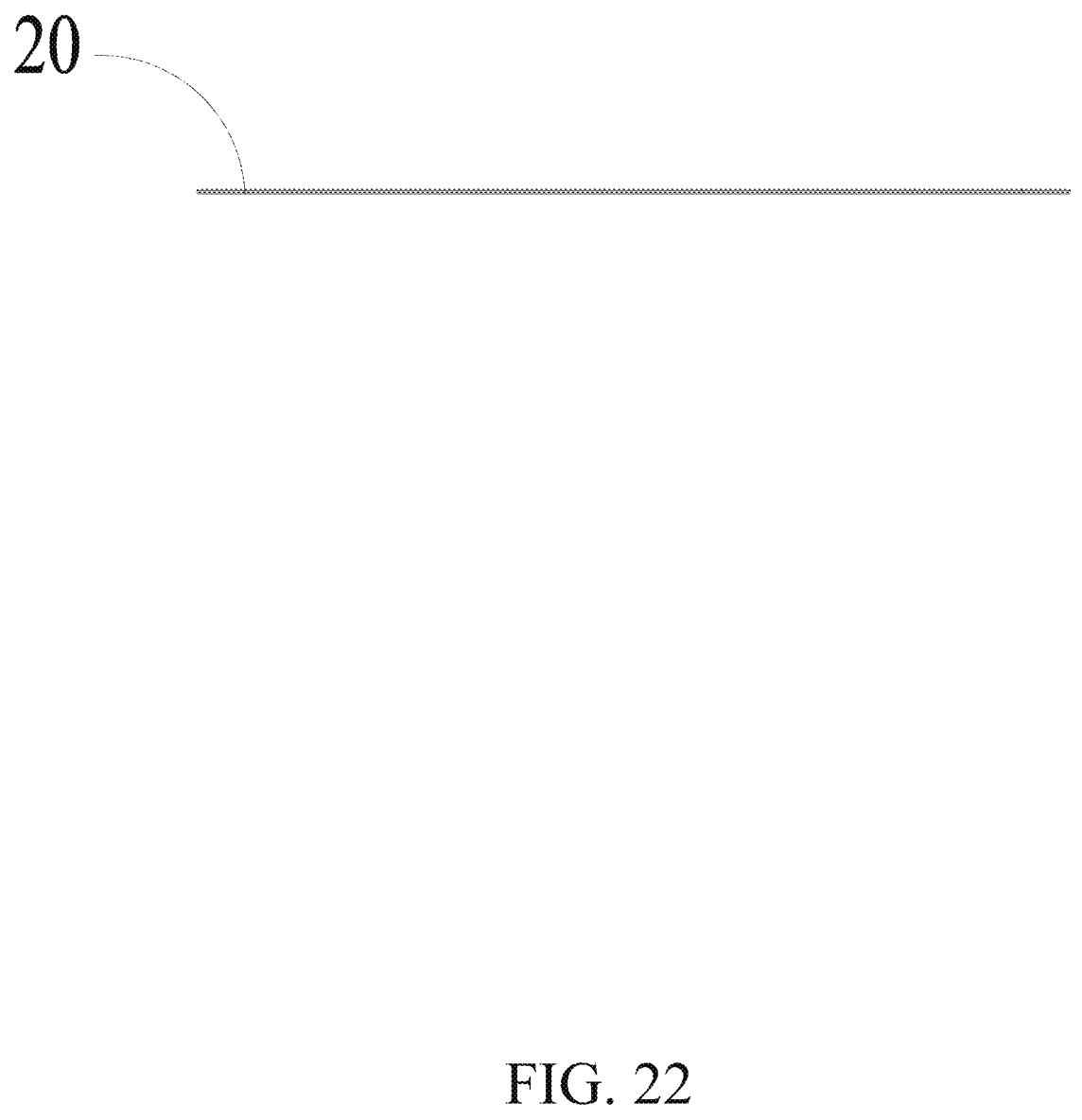

Referring to FIG. 22, FIG. 22 is a schematic diagram of a second thermal insulation layer of a thermal insulation mat provided by yet another embodiment of this application in an unfolded state. This figure shows a total thickness 3-12 mm of the second thermal insulation layer 20 after the rubber-plastic material and the aluminum foil are laminated.

It should be noted that the shape of the mat 100 may also be a circle, a triangle, an irregular shape, or the like. In this embodiment, the shape of the mat is preferably a rectangle.

It should be noted that the folded stitching thread of the mat 100 may be in shape of a parallel vertical reference line for spacing, cross shape or a quadrilateral grid pattern. In this embodiment, the folded stitching thread of the mat is preferably in shape of a parallel vertical reference line for spacing.

It should be noted that the length and width of the mat 100 may be expanded infinitely, which are not limited herein.

The meaning of the descriptive terms such as "preset temperature" and the "preset time" mentioned in this application is as follows: the "preset temperature" refers to a target temperature value preset by the user according to a requirement, and the "preset time" refers to an equipment operation duration or operation trigger time preset by the user.

In this application, the descriptive terms such as "approximately", "roughly" and "nearly" mean that the range fluctuation thereof may be within +10% relative to the standard value.

In this application, the term "at least one" means either one of the situations or the coexistence of multiple situations among them. For example, "at least one of A, B, and C" includes all permutations and combinations of the following scenarios: A alone, B alone, C alone, the coexistence of A and B, and the coexistence of A and C, among others. It is not described one by one in detail.

The above is merely the embodiments of the present disclosure. It shall be noted that those of ordinary skill in the art may further make improvements without departing from the creative concept of the present disclosure, and these improvements all fall within the protection scope of the present disclosure.

What is claimed is:

1. A thermal insulation mat, comprising:

a main body portion, at least one folded portion, and edge portions, wherein the edge portions are arranged at edges of the main body portion, and the folded portion penetrates through the main body portion;

the main body portion comprises:

a first thermal insulation layer, comprising:

an upper thermal insulation sheet, consisting of a fabric, a coating, and an aluminum foil, wherein the coating is applied between the aluminum foil and the fabric; and the upper thermal insulation sheet is configured as a surface of the mat and is configured to contact a heat source;

a lower thermal insulation sheet, arranged opposite to the upper thermal insulation sheet and consisting of a fabric, a coating, and an aluminum foil, wherein the coating is applied between the aluminum foil and the fabric; and the lower thermal insulation sheet is configured a bottom surface of the mat, and the upper thermal insulation sheet and the lower thermal insulation sheet are arranged opposite to each other to form a receiving space; and a second thermal insulation layer, configured to be located within the receiving space of the first thermal insulation layer, made of a flexible material, and sandwiched between the upper thermal insulation sheet and the lower thermal insulation sheet;

the upper thermal insulation sheet, the second thermal insulation layer, and the lower thermal insulation sheet are stacked from top to bottom in sequence to form the main body portion; and the edge portion comprises:

a connecting strip, wherein the connecting strip is arranged along the edge portion, and the connecting strip fixes the upper thermal insulation sheet, the second thermal insulation layer, and the lower thermal insulation sheet from top to bottom in sequence by way of a stitching thread, such that the upper thermal insulation sheet, the second thermal insulation layer, and the lower thermal insulation sheet are aligned from top to bottom in sequence; and the upper thermal insulation sheet, the second thermal insulation layer, and the lower thermal insulation sheet are foldable along the folded portion;

a texture is arranged on the surface of the mat or the bottom surface of the mat and comprises a concave area and a convex area, the concave area and the convex area are arranged adjacent to each other, and a shape of the convex area is at least one of a circle, a triangle, a polygon, an ellipse, and an irregular shape;

wherein the second thermal insulation layer comprises:

a second aluminum foil;

a plastic or a rubber; and a third aluminum foil, wherein the second aluminum foil, the plastic or rubber, and the third aluminum foil are arranged in sequence and are all of sheet structures, wherein the plastic or rubber is sandwiched between the second aluminum foil and the third aluminum foil, and the second aluminum foil, the plastic or rubber, and the third aluminum foil are substantially the same in shape and size;

wherein a thickness of the upper thermal insulation sheet and a thickness of the lower thermal insulation sheet are both 0.3-0.9 mm, and a thickness of the second thermal insulation layer is 3-12 mm;

wherein the second aluminum foil and the third aluminum foil are laminated on a surface layer and a bottom layer of a rubber-plastic material to form a double-sided reflecting layer, a continuous sealing layer is formed between the aluminum foil and the rubber-plastic material.

2. The thermal insulation mat according to claim 1, wherein the upper thermal insulation sheet comprises an outer surface and an inner surface, the outer surface and the inner surface are arranged opposite to each other, the aluminum foil, the coating, and the fabric are superposed from outside to inside in sequence between the outer surface and the inner surface, and the aluminum foil, the coating, and the fabric are formed by a hot pressing process; and the aluminum foil forms the outer surface, the fabric forms the inner surface, and the coating is sandwiched between the outer surface and the inner surface.

3. The thermal insulation mat according to claim 1, wherein the lower thermal insulation sheet comprises an outer surface and an inner surface, the outer surface and the inner surface are arranged opposite to each other, the aluminum foil, the coating, and the fabric are superposed from outside to inside in sequence between the outer surface and the inner surface, and the aluminum foil, the coating, and the fabric are formed by a hot pressing process; and the aluminum foil forms the outer surface, the fabric forms the inner surface, and the coating is sandwiched between the outer surface and the inner surface.

4. The thermal insulation mat according to claim 1, wherein the upper thermal insulation sheet and the lower thermal insulation sheet are substantially the same in shape and size.

5. The thermal insulation mat according to claim 1, wherein the fabric is at least one of an oxford fabric, or a canvas, or a plain weave fabric.

6. The thermal insulation mat according to claim 1, wherein a material of the coating is at least one of polyethylene, (PE), polyurethane, (PU), thermoplastic polyurethane, (TPU), polyvinyl chloride, (PVC), and polyethylene glycol terephthalate, (PET).

7. The thermal insulation mat according to claim 1, wherein the folded portion comprises at least one stitching thread, the stitching thread extends along the main body portion from one edge portion to another edge portion and penetrates through the main body portion; and a thickness of the folded portion is less than a thickness of the main body portion.

8. The thermal insulation mat according to claim 7, wherein a thickness range of the main body portion is 3-15 mm.

9. The thermal insulation mat according to claim 7, capable of being at least folded twice along the stitching thread.

10. The thermal insulation mat according to claim 9, wherein a shape of the stitching thread on the main body portion is at least one of a parallel line, a cross shape, or a quadrilateral grid pattern.

11. The thermal insulation mat according to claim 1, wherein after being folded along the folded portion, the main body portion is divided into a plurality of rectangles along the folded portion.

12. The thermal insulation mat according to claim 1, wherein the main body portion has a folded state and an unfolded state; and when folded along the folded portion, the main body portion is in the folded state; and when located in the same plane, the main body portion is in the unfolded state.

* * * * *